United States Patent [19]

Darlington

[11] 4,308,520
[45] Dec. 29, 1981

[54] TIRE PRESSURE INDICATOR

[75] Inventor: William W. Darlington, Sherman Oaks, Calif.

[73] Assignee: Edcliff Instruments, Monrovia, Calif.

[21] Appl. No.: 712

[22] Filed: Jan. 3, 1979

Related U.S. Application Data

[63] Continuation of Ser. No. 710,241, Jul. 30, 1976, abandoned.

[51] Int. Cl.³ .................... B60C 23/02; G08B 19/00
[52] U.S. Cl. ............................ 340/58; 73/146.5; 73/146.8; 200/61.25; 340/539
[58] Field of Search ............... 340/58, 60, 531, 539; 200/61.22, 61.25; 73/146.3, 146.5, 146.8

[56] References Cited

U.S. PATENT DOCUMENTS

| | | | |
|---|---|---|---|
| 2,818,732 | 1/1958 | Bennett | 340/539 X |
| 3,462,735 | 8/1969 | Hawes | 340/58 |
| 3,503,062 | 3/1970 | Witzke et al. | 340/636 |
| 3,533,063 | 10/1970 | Garcia | 340/58 |
| 3,594,751 | 7/1971 | Ogden et al. | 340/509 |
| 3,694,803 | 9/1972 | Strenglein | 340/58 |
| 3,723,966 | 3/1973 | Mueller et al. | 340/58 |
| 3,858,174 | 12/1974 | Harris | 340/58 |
| 3,911,434 | 10/1975 | Cook | 340/58 X |
| 4,004,288 | 1/1977 | Webb, Jr. | 340/628 |
| 4,074,227 | 2/1978 | Kalmus | 340/58 |

Primary Examiner—John W. Caldwell, Sr.
Assistant Examiner—Joseph E. Nowicki
Attorney, Agent, or Firm—Flehr, Hohbach, Test, Albritton & Herbert

[57] ABSTRACT

Tire pressure indicator having a wheel mounted transponder unit and a hand-held interrogator unit which can be positioned for coupling with the transponder unit. The transponder unit is a passive device which returns signals to the interrogator unit in accordance with the pressure in the tire mounted on the wheel. When the tire pressure is above a predetermined safe level, a "safe" light on the interrogator unit is illuminated, and when the pressure is below the safe level, a "low" light is illuminated. Operating power for the interrogator unit is supplied by a battery in the unit, and the lights are flashed at a visible rate when the battery voltage drops below a predetermined level.

13 Claims, 5 Drawing Figures

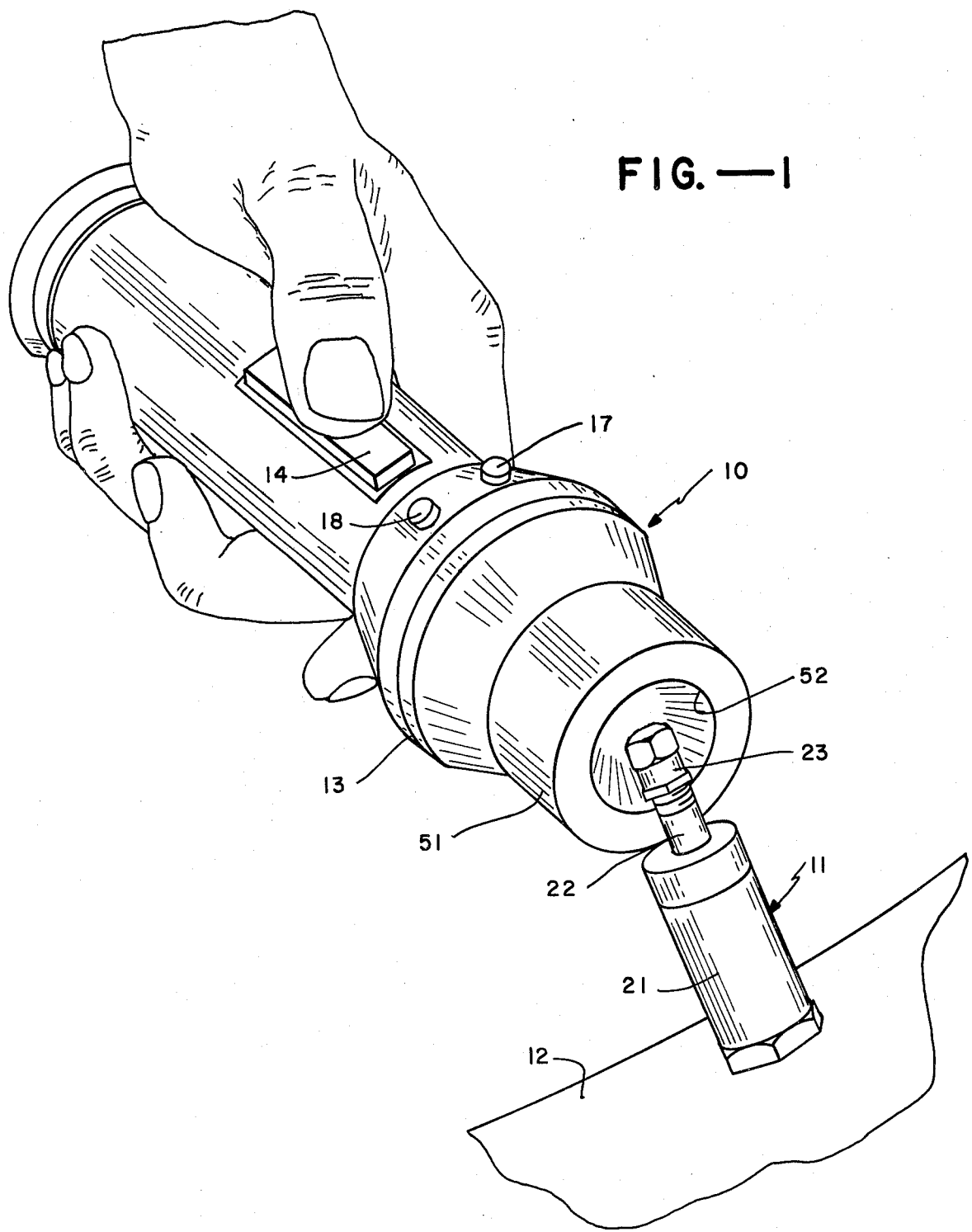
FIG.—1

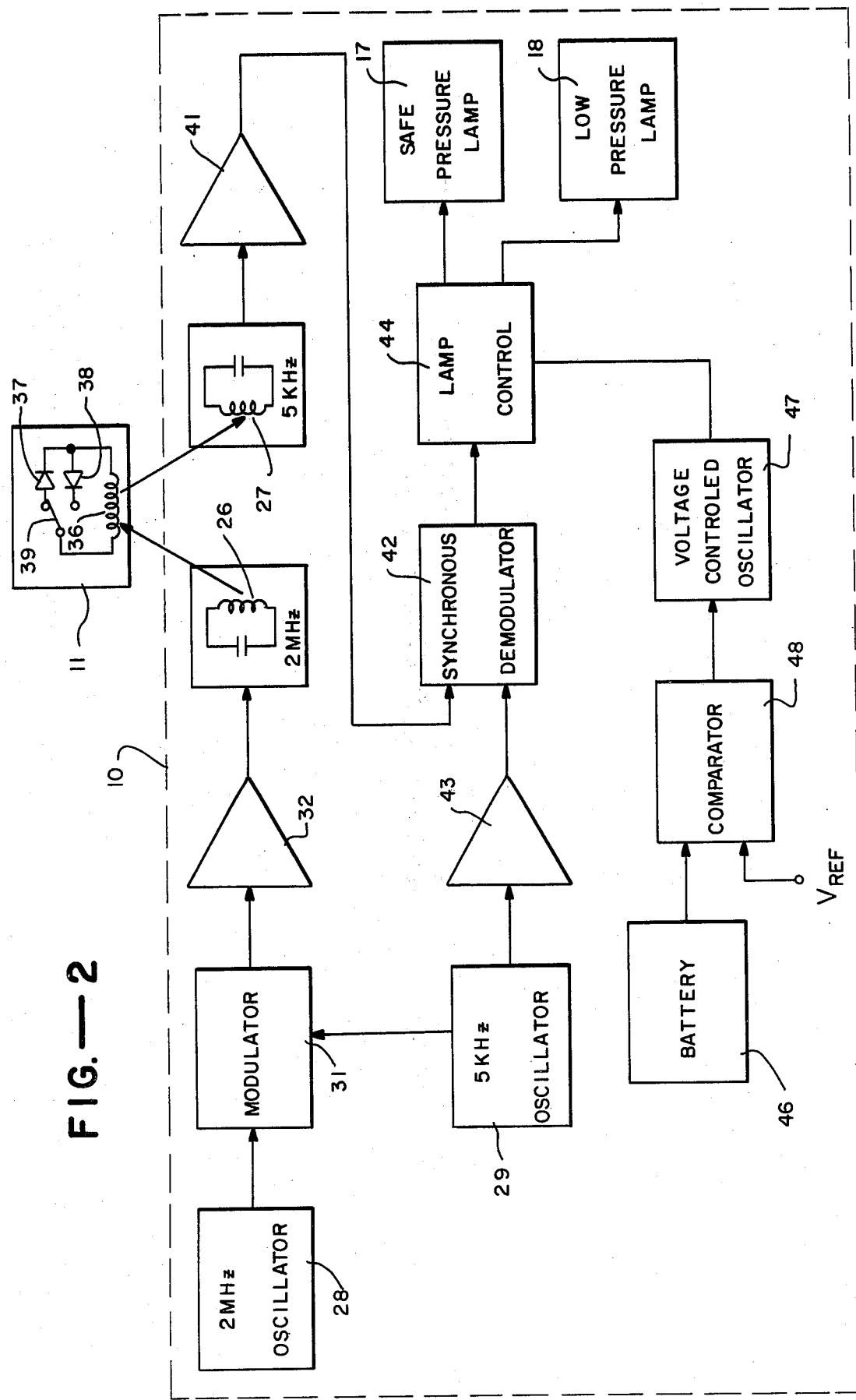
FIG.—2

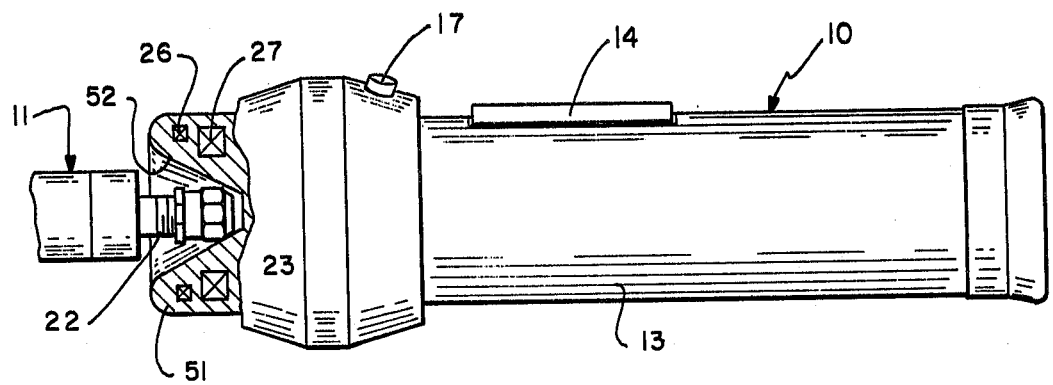
FIG.—3
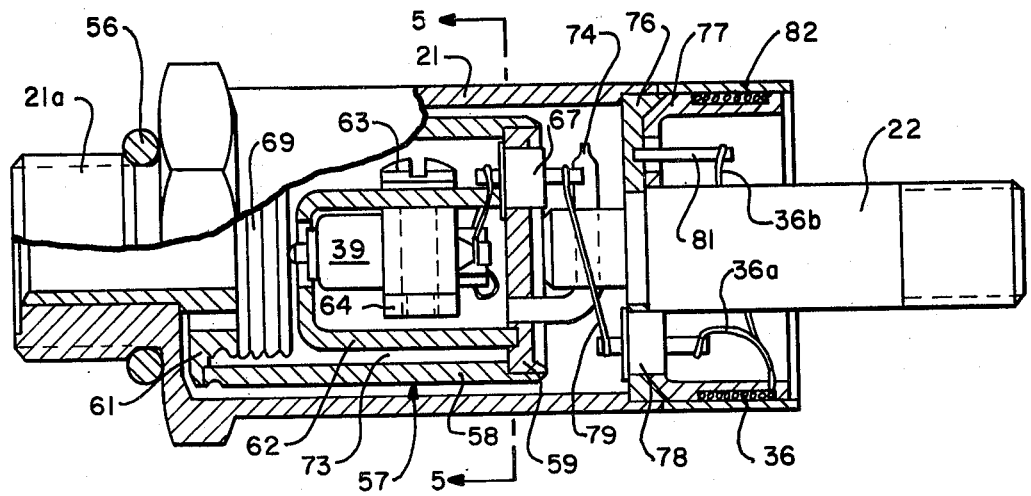
FIG.—4
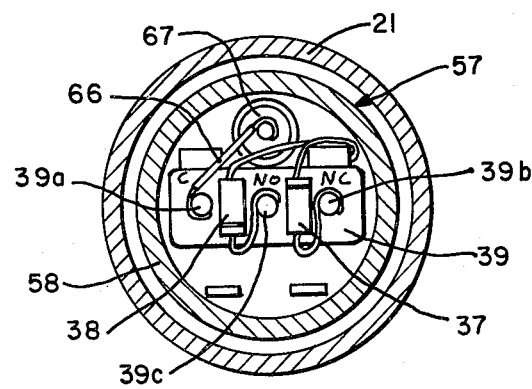
FIG.—5

TIRE PRESSURE INDICATOR

This is a continuation of application Ser. No. 710,241, filed July 30, 1976, now abandoned.

BACKGROUND OF THE INVENTION

This invention pertains generally to pneumatic tire pressure indicators and more particularly to a device for quickly and accurately checking the inflation level of aircraft tires and other pneumatic tires.

With pneumatic tires of the type used on aircraft, automobiles and in other applications, under-inflation is a major cause of premature tire failure, including blow-outs. The conventional technique of checking tire pressure requires the steps of removing the valve cap, applying a pressure gauge to the valve stem, reading the pressure, replacing the cap and, in the case of aircraft tires, correcting the pressure reading for temperature differences by reference to a temperature conversion table. This procedure is inconvenient and time consuming, and as a consequence, tire pressures are frequently not checked as often as might otherwise be desirable.

With aircraft tires, which under normal conditions can lose as much as 5 percent of their inflation level per day, it would be advisable to check the pressure before each flight.

SUMMARY AND OBJECTS OF THE INVENTION

The invention provides a tire pressure indicator for quickly and accurately checking the pressure of aircraft tires and other tires. A pressure responsive transponder unit is mounted on each wheel and interrogated by a hand-held unit which can be moved quickly from one wheel to another. The interrogator unit includes a transmitting coil tuned to a first frequency, a receiving coil tuned to a second frequency, and means for exciting the transmitting coil with a signal of the first frequency modulated with a signal of the second frequency. The transponder includes a coil, two diodes and a pressure-actuated switch for connecting the diodes across the coil with a phase polarity corresponding to the level of the pressure in the tire. With the interrogator coil coupled to the transponder coil and the pressure in the tire above a predetermined "safe" level, the transponder induces a signal of one phase polarity in the receiving coil. When the tire pressure is below the predetermined level, a signal of the opposite phase polarity is induced. The interrogator includes means for processing the induced signals and illuminating lamps to indicate whether the tire pressure is "safe" or "low". Power is supplied to the lamps from a battery in the interrogator at less than a 100 percent duty cycle, and means is included for reducing the frequency of the power to provide a visible flashing of the lamps if the battery voltage drops to a low level.

It is in general an object of the invention to provide a new and improved tire pressure indicator.

Another object of the invention is to provide a tire pressure indicator of the above character which is particularly suitable for checking the pressure in aircraft tires.

Another object of the invention is to provide a tire pressure indicator of the above character which can be used quickly and requires no connection to the tire or wheel.

Additional objects and features of the invention will be apparent from the following description in which the preferred embodiment is set forth in detail in conjunction with the accompanying drawings.

BRIEF DESCRIPTION OF THE DRAWINGS

FIG. 1 is a perspective view of one embodiment of a tire pressure indicator incorporating the invention.

FIG. 2 is a block diagram of the tire pressure indicator of FIG. 1.

FIG. 3 is an elevational view, partly broken away, of the interrogator unit of the tire pressure indicator of FIG. 1, with the interrogator unit positioned for coupling with the transponder unit.

FIG. 4 is an enlarged elevational view, partly broken away, of the transponder unit of the tire pressure indicator illustrated in FIG. 1.

FIG. 5 is a cross sectional view taken along line 5—5 in FIG. 4.

DESCRIPTION OF THE PREFERRED EMBODIMENT

The tire pressure indicator comprises an interrogator unit 10 and a transponder unit 11. As illustrated in FIG. 1, the interrogator unit is adapted to be held in the hand of an operator, and the transponder unit is mounted on the rim 12 of a wheel. The interrogator unit includes a housing 13 similar to a conventional flashlight case and a manually operable ON-OFF switch 14 for controlling energization of the interrogator unit from a battery contained therein. As illustrated, the housing can be held in the palm of the hand and grasped by the thumb and fingers in the manner of a flashlight, with switch 14 in position to be actuated by the thumb of the hand holding the unit. Lamps 17, 18 are mounted on housing 13 and, as discussed hereinafter in detail, are illustrated to indicate whether the pressure in the tire is above or below a predetermined safe level In the preferred embodiment, the lamps are light emitting diodes positioned behind colored jewels. The transponder assembly includes a housing 21, a valve stem 22, and a valve cap 23 threadedly mounted on the valve stem. The valve stem is of conventional design and contains a conventional valve core (not shown) for controlling the flow of air to and from the tire mounted on the wheel.

Referring now to FIG. 2, interrogator unit 10 also includes a transmitting coil 26 tuned for resonance at a frequency of 2 MHz, a receiving coil 27 tuned to a frequency of 5 KHz, and means for applying to the transmitting coil a 2 MHz signal modulated by a 5 KHz signal. This means includes a 2 MHz oscillator 28, a 5 KHz oscillator 29, and a modulator 31. Oscillators 28, 29 are square wave oscillators of conventional design, and modulator 31 is an amplitude modulator. The output of modulator 31 is a 2 MHz signal which is turned on and off at a 5 KHz rate. The output of the modulator is applied to the input of a 2 MHz amplifier 32, and the output of the amplifier is applied to the transmitting coil.

Transponder unit 11 includes means responsive to tire pressure and to the signal from transmitting coil 26 for returning to receiving coil 27 a signal corresponding to the level of pressure in the tire. This means includes a coil 36 adapted for coupling with the transmitting and receiving coils, oppositely polarized diodes 37, 38, and a pressure responsive switch 39 for connecting one or the other of the diodes across coil 36. The signal induced in receiving coil 27 is a 5 KHz signal which is in phase with the signal from oscillator 29 when the tire pressure is above a predetermined "safe" level and which is out of phase with the oscillator signal when the pressure is below the "safe" level.

The signal from receiving coil 27 is applied to a 5 KHz amplifier 41, and the output of this amplifier is connected to the modulation input of a synchronous demodulator 42. The demodulator receives a 5 KHz reference signal from oscillator 29 via amplifier 43. The synchronous demodulator is of conventional design and produces a positive output signal when the received signal is in phase with the reference signal, a negative output signal when the received signal is out of phase with the reference signal, and a zero output in the absence of a received signal.

The output of demodulator 42 is connected to the input of a lamp control circuit 44 which energizes lamps 17, 18 in accordance with the output of the demodulator. In the preferred embodiment, the lamp control comprises a conventional level detector which serves to energize "safe" pressure lamp 17 when the output of the demodulator is positive and to illuminate "low" pressure lamp 18 when the demodulator output is negative. When the demodulator output is zero, neither lamp is illuminated. As noted above, in the preferred embodiment, lamps 17, 18 comprise light emitting diodes.

Operating power for the interrogator unit is obtained from a battery 46, and means is provided for operating lamps 17, 18 at less than a 100 percent duty cycle to conserve battery power. This means includes a voltage controlled oscillator 47, which in the preferred embodiment is a square wave oscillator which normally operates at a frequency of 200 Hz. The output of oscillator 47 is applied to lamp control 44 and causes the lamps to blink on and off at the operating frequency of the oscillator. At a frequency of 200 Hz, the lamps appear to glow steadily, while drawing only one half of their normal power.

Means is also provided for monitoring the condition of the battery and providing a warning when the battery voltage drops to an unreliable level. This means includes a voltage comparator 48 which receives a first input from the battery and a second input from a reference voltage source. The output of the comparator is connected to the control input of oscillator 47. As long as the battery voltage remains above the reference voltage, the output of the comparator conditions oscillator 47 to operate at the normal 200 Hz frequency. If the battery voltage drops below the level of the reference voltage, the output of the comparator conditions the oscillator to operate at a frequency of 10 Hz, producing visible flashing of lamps 17, 18.

Transmitting coil 26 and receiving coil 27 are mounted in an insulative block 51 toward the front of interrogator unit 10. This block is formed with a conical recess 52 for receiving the outer portion of transponder unit 11 when the interrogator unit is positioned in proximity to the transponder unit. The inclined wall of recess 52 serves as a guide for the valve stem of the transponder unit, and coils 26, 27 are disposed coaxially of the recess to assure uniform coupling with the transponder coil.

As noted above, transponder unit 11 is mounted on the rim of a wheel in place of the conventional valve stem. For this purpose, housing 21 is provided with an axially extending nipple 21a which threadedly engages the valve opening in the rim. An O-ring 56 surrounds the nipple and assures a pressure tight seal between the rim and the transponder body.

Diodes 37, 38 and switch 39 are included in a switch assembly 57 which is mounted within housing 21. The switch assembly includes a housing comprising a generally cylindrical side wall 58 and end walls 59, 61. A generally U-shaped mounting bracket 62 is mounted on the inner side of end wall 59. Switch 39 comprises a single pole, double throw microswitch which is secured to one leg of bracket 62 by screws 63 and a nut plate 64. The common terminal 39a of the microswitch is connected by a lead 66 to a feedthrough terminal 67 mounted on end wall 59. The anode of diode 37 is connected to the normally closed contact 39b of the microswitch, and the cathode of this diode is grounded to the transponder housing. The cathode of diode 38 is connected to the normally open contact 39c of the microswitch, and the anode of this diode is grounded to the housing.

Microswitch 39 is actuated by a bellows 69 mounted on end wall 61. In the preferred embodiment, the bellows is a nesting ripple type having a plurality of corrugated diaphrams welded together. The corrugations are formed in such manner that they fit into each other, resulting in a bellows which provides relatively large deflections in response to relatively small pressure differentials. When the pressure outside the bellows exceeds the inside pressure, the bellows will collapse upon itself to form a solid structure which can sustain high over pressures. The inside of the bellows communicates with the interior of the tire through a stem 71 which is formed integrally with end wall 61 and extends through nipple 21a. Openings formed in end wall 61 provide communication between the inside of the bellows and the region between housing 21 and housing 51.

End walls 59, 61 are hermetically sealed to side wall 58 to form a closed reference chamber 73 within the switch assembly housing. This chamber is pressurized with a suitable gas, such as dry nitrogen, to set the pressure level at which bellows 69 actuates microswitch 39. Access to chamber 73 is provided by tubing 74 which extends through end wall 59 and is sealed closed once the reference pressure has been established in the chamber.

Valve stem 22 is mounted on a circular end plate 76 which forms the outer wall of the transponder housing. Coil 36 is wound upon a cup shaped bobbin 77 mounted on the outer side of end plate 76. One end of winding 36 is connected by a lead 36a to a feedthrough terminal 78 mounted on end plate 76. A lead 79 is connected between terminals 78 and 67 to complete a circuit between the end of the winding and the common terminal of the microswitch. The other end of the winding is grounded to the transponder housing by a lead 36b connected to a pin 81 mounted on end plate 76. A cylindrical cover 82 surrounds the coil, and the interior of the bobbin is filled with an epoxy compound.

Operation and use of the tire pressure indicator can now be described. It is assumed that chamber 73 has been pressurized to a level corresponding to the minimum safe inflation level for a tire and that transponder unit 11 has been mounted on the rim of a wheel in place of a conventional valve stem. The tire can be inflated by applying air under pressure to valve stems 22. This air passes through the region formed between housing 21 and the switch assembly housing, through openings 72 in end wall 61, and through stem 71 to the tire.

To check the pressure of the tire, the operator positions the interrogator unit over the transponder unit, with valve stem 22 and cap 23 extending into cavity 52, and depresses switch 14 whereupon transmitting coil 26 is energized by a 2 MHz signal modulated by the 5 KHz from reference oscillator 29. With the interrogator unit positioned over the transponder unit, coils 26, 27 are coupled to coil 36, and a 5 KHz signal is induced in receiving coil 27. The phase polarity of the induced signal is determined by the pressure in the tire. If the tire pressure is greater than the reference pressure in chamber 73, microswitch 39 will be actuated to connect diode 38 across coil 36, and the induced signal will be in phase with the 5 KHz reference signal. If the tire pressure is below the reference pressure, the microswitch will connect diode 37 across the coil, and the induced signal will be 180 degrees out of phase with the reference signal.

After amplification, the signal induced in coil 27 is processed by demodulator 42 to provide a positive output signal if the tire pressure exceeds the reference pressure and a negative output signal if the tire pressure is less than the reference pressure. The output level of the demodulator is detected by lamp control 44 which energizes either lamp 17 or lamp 18 to indicate the condition of the tire pressure.

Under normal conditions, power is supplied to lamps 17, 18 at a frequency of 200 Hz, which produces illumination which appears to be continuous although reducing power consumption by a factor of 50 percent. If the battery voltage drops to a level requiring recharging or replacement of the batteries, power is supplied to the lamps at a frequency of 10 Hz to provide visible flashing.

The invention has a number of important features and advantages. The interrogator unit is lightweight and easy to carry, and pressure can be checked quickly and accurately by a simple scanning of the transponder unit. Since the transmitting and receiving coils are tuned to different frequencies, no current is induced in the receiving coil unless the coils are coupled with the transponder coil. The transponder unit is a passive device which is rugged in construction and can survive the rough use to which wheels are commonly subjected. The accuracy of the device is substantially unaffected by temperature changes since the gas in the reference chamber will always be at substantially the same temperature as the air in the tire. Thus, any temperature induced variations in gas or air volume will offset each other, and the pressure differential across the bellows will remain essentially constant.

The device is fail-safe in operation in that most mechanical or electrical failures will produce either a "low pressure" indication or no indication, rather than a "safe pressure" indication. To produce a "safe pressure" indication, all of the following conditions must be satisfied: (1) the pressure on the tire side of the bellows must be higher than the pressure in the reference chamber; (2) the bellows must expand a distance sufficient to actuate the switch; (3) the switch must actuate; (4) the switch must connect the proper diode to the coil; and (5) the coil and the diode must both function correctly. If any of the first three conditions is not met, the device will produce a "low pressure" signal, and if either of the last two conditions fails, there will be no output signal. Such a failure does not disable the aircraft, however, since the tire pressure can still be checked and adjusted in the conventional manner.

It is apparent from the foregoing that a new and improved tire pressure indicator has been provided. While only one presently preferred embodiment has been described, as will be apparent to those familiar with the art, certain changes and modifications can be made without departing from the scope of the invention as defined by the following claims.

What is claimed is:

1. In a system for checking the pressure in a tire: a handheld interrogator unit comprising an elongated generally cylindrical housing of a size suitable to be gripped and held in the hand, transmitter and receiver means mounted in the housing, transmitting and receiving coils connected to the transmitter and receiver means and positioned toward one end of the housing, a wheel-mounted transponder unit including means responsive to the pressure in the tire and to signals from the transmitting coil for returning to the receiving coil a signal corresponding to the pressure in the tire when the interrogator unit is held up to the transponder unit, the interrogator unit housing having an end member defining an outwardly opening cavity which extends inwardly through the openings in the coils for receiving a portion of the transponder unit therein to provide close coupling between the coils and the transponder unit, and indicator means responsive to the returned signal and visible externally of the housing for indicating the level of the pressure in the tire.

2. The system of claim 1 wherein the transponder unit includes a bellows assembly to which the pressure in the tire is applied and switch means actuated by the bellows assembly to assume a first state when the pressure is above a predetermined level and a second state when the pressure is below the predetermined level.

3. The system of claim 2 wherein the bellows assembly is mounted in a chamber pressurized to a level corresponding to the predetermined level.

4. The system of claim 1 further including a power source within the housing and a manually operable switch accessible externally of the housing for controlling energization of the interrogator unit with power from the source.

5. The system of claim 1 wherein the indicator means includes first and second indicator lights mounted on the housing, and means for illuminating the first light if the pressure in the tire is above a predetermined level and illuminating the second light if the pressure is below the predetermined level.

6. The system of claim 5 further including a power source within the housing and means for applying power from the source to the lights as a duty cycle less than 100 percent.

7. The system of claim 6 further including means responsive to the output of the power source for decreasing the duty cycle to produce visible flashing of at least one of the lights in the event that the output drops to a predetermined level.

8. The system of claim 1 wherein the end member comprises an insulative block in which the coils are embedded and the inwardly extending cavity comprises a generally conical recess disposed coaxially of the coils.

9. The system of claim 1 wherein the indicator means comprises a light emitting element mounted on the housing, said light emitting element being energized to provide a positive indication when the tire pressure is below the predetermined level.

10. The system of claim 1 wherein the transponder unit is mounted on the wheel in place of a conventional valve stem and includes a housing defining an internal chamber in communication with the tire, and a valve stem carried by the housing and communicating with the tire through the chamber in the housing, said pressure responsive means being positioned within the chamber.

11. The system of claim 1 wherein the transmitting and receiving coils are tuned to first and second frequencies, respectively, the transmitter means includes means for applying to the transmitting coil a signal of the first frequency modulated with a signal of the second frequency, and the transponder unit includes means including a coil adapted for coupling with the transmitting and receiving coils and producing a signal of the second frequency in the receiving coil in response to the signal in the transmitting coil.

12. The system of claim 11 wherein the means for producing a signal in the receiving coil further includes first and second diodes of opposite polarities and switch means responsive to the pressure in the tire for connecting the first diode across the transponder coil when the pressure is above a predetermined level and connecting the second diode across the transponder coil when the pressure is below the predetermined level.

13. In a system for checking the pressure in a tire mounted on a wheel: an interrogator unit having transmitting and receiving coils tuned to first and second frequencies, means for applying to the transmitting coil a signal of the first frequency modulated at the second frequency, a transponder unit mounted on the wheel in place of a conventional valve stem and having a generally cylindrical housing defining an internal chamber in communication with the tire, a nipple extending axially from the inner end of the housing and threadedly received in the valve stem opening of the wheel, a valve stem extending axially from the outer end of the housing and communicating with the tire through the chamber in the housing, a coil wound coaxially about the valve stem toward the outer end of the housing for coupling with the transmitting and receiving coils when the interrogator unit is held in close proximity to the transducer unit, pressure responsive switch means within the chamber for completing an electrical circuit with the transponder coil to condition the transponder to return a signal indicative of the tire pressure to the interrogator unit, and means forming a part of the interrogator unit responsive to the signal from the transponder unit for providing an indication of the pressure in the tire.

* * * * *